(12) United States Patent
Kulack et al.

(10) Patent No.: US 9,594,788 B2
(45) Date of Patent: Mar. 14, 2017

(54) DISPLAYING LOGICAL STATEMENT RELATIONSHIPS BETWEEN DIVERSE DOCUMENTS IN A RESEARCH DOMAIN

(75) Inventors: Frederick A. Kulack, Rochester, MN (US); Kevin G. Paterson, San Antonio, TX (US); Shannon E. Wenzel, Colby, WI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1315 days.

(21) Appl. No.: 13/035,310

(22) Filed: Feb. 25, 2011

(65) Prior Publication Data

US 2012/0221583 A1 Aug. 30, 2012

(51) Int. Cl.
*G06F 17/30* (2006.01)

(52) U.S. Cl.
CPC .. *G06F 17/30342* (2013.01); *G06F 17/30616* (2013.01); *G06F 17/30696* (2013.01)

(58) Field of Classification Search
CPC ......... G06F 17/30342; G06F 17/30616; G06F 17/30696; G06Q 10/04; G06Q 40/06
See application file for complete search history.

(56) References Cited

U.S. PATENT DOCUMENTS

| | | | |
|---|---|---|---|
| 6,263,335 B1 * | 7/2001 | Paik et al. | |
| 6,289,342 B1 * | 9/2001 | Lawrence et al. | |
| 6,502,081 B1 * | 12/2002 | Wiltshire et al. | 706/12 |
| 7,313,515 B2 * | 12/2007 | Crouch et al. | 704/9 |
| 7,860,706 B2 * | 12/2010 | Abir | 704/4 |
| 7,904,401 B2 * | 3/2011 | Dolby et al. | 706/45 |
| 8,065,290 B2 * | 11/2011 | Hogue | 707/706 |
| 8,112,369 B2 * | 2/2012 | Abramson | 706/12 |
| 8,335,754 B2 * | 12/2012 | Dawson et al. | 706/45 |
| 2004/0059736 A1 * | 3/2004 | Willse et al. | 707/100 |
| 2005/0203924 A1 * | 9/2005 | Rosenberg | 707/100 |
| 2006/0053135 A1 * | 3/2006 | Beaumont et al. | 707/101 |
| 2006/0053382 A1 * | 3/2006 | Gardner et al. | 715/764 |
| 2007/0112819 A1 | 5/2007 | Dettinger et al. | |
| 2008/0133213 A1 * | 6/2008 | Pollara | 703/22 |
| 2009/0144609 A1 * | 6/2009 | Liang et al. | 715/230 |
| 2010/0088262 A1 * | 4/2010 | Visel et al. | 706/18 |
| 2010/0228693 A1 * | 9/2010 | Dawson et al. | 706/12 |

(Continued)

OTHER PUBLICATIONS

Dettinger, et al, U.S. Appl. No. 12/771,086 entitled, "Managed Document Research Domains", Filed Apr. 30, 2010.

*Primary Examiner* — Scott A Waldron
*Assistant Examiner* — Mellissa M Ohba
(74) *Attorney, Agent, or Firm* — Patterson + Sheridan, LLP (57) ABSTRACT

Method and apparatus for analyzing a document against a managed research domain are provided. In one embodiment, a managed research domain provides an infrastructure where logical statements in research documents stored in the research domain repository are quantified and semantically analyzed. A user may submit a draft research document for analysis against the managed research domain to compare the draft against the current research knowledge in particular topics. The draft research document is annotated to reflect how the logical statements in the draft compare to the statements made on similar topics in the managed research domain.

14 Claims, 9 Drawing Sheets

(56) References Cited

U.S. PATENT DOCUMENTS

2010/0257117 A1* 10/2010 Shvadron .......... G06F 17/30616
  705/36 R
2011/0270856 A1* 11/2011 Dettinger et al. ............ 707/758
2012/0158742 A1* 6/2012 Kulack ............. G06F 17/30616
  707/748

* cited by examiner

ASSERTION METADATA 500

| ID (520) | 1ST TOPIC (522) | RELATION SHIP (524) | 2ND TOPIC (526) | STRENGTH (528) | DATE ADDED (530) | DATE MOD (532) | DATE DEL (534) | |
|---|---|---|---|---|---|---|---|---|
| ID1 | A | CAUSES | B | +2 | 1/1/10 | 9/6/10 | | 502 |
| ID2 | A | CURES | B | -2 | 6/4/09 | | | 504 |
| ID3 | A | MIGHT CAUSE | B | +1 | 2/3/09 | | | 506 |
| ID4 | A | MIGHT CURE | B | -1 | 6/4/10 | | | 508 |
| ID5 | A | IS | C | +2 | 3/5/08 | | 4/1/10 | 510, 512 |
| ID6 | D | IS NOT | E | -2 | 9/8/08 | 3/6/09 | | |
| ID7 | D | MIGHT NOT BE | E | -1 | 7/2/08 | | | 514 |
| ID8 | D | NO EVIDENCE EXISTS | E | 0 | 7/3/08 | | | 516 |

DISPLAYING LOGICAL STATEMENT RELATIONSHIPS BETWEEN DIVERSE DOCUMENTS IN A RESEARCH DOMAIN

BACKGROUND

Many researchers and research institutions are moving to publishing original research and data as well as study/reference materials online. As a result, Internet search engines may be used to access a broad variety of original research. Because the Internet contains vast amounts of information that may be searched quickly and efficiently, researchers and academics are using the Internet more and more to conduct their research.

Researchers also can electronically publish and store research documents in a managed document repository, or a managed document research domain. Special tools have been applied to the contents of the research documents to categorize and sort the research based on their particular topic. Specifically, text analytics exist that find patterns in, interpret, assign meaning to or give structure to the document contents. One such tool is the Unstructured Information Management Architecture (UIMA) framework available from International Business Machines (IBM) Corporation, which provides a common framework for processing unstructured information to extract meaning and create structured data from the unstructured information.

Researchers seeking to publish new research results or draft new research papers often face the problem of comparing their research with existing publications or the general scientific consensus. For example, researchers may want to know whether their statements are far outside the established consensus. Typically, a researcher must provide comprehensive support for unconventional or strong assertions in their research, and provide less support for generally accepted statements. As such, given the overwhelming volume of new research published to the Internet, it can be difficult for a researcher to compare their paper to the other similar research or to the pool of general knowledge in a particular topic.

SUMMARY

Embodiments of the invention provide techniques for displaying logical statement relationships between diverse documents in a research domain. One embodiment of the invention includes a method for analyzing a document with a managed research domain. The method may generally include parsing the text of a first document to identify one or more assertions made by the text of the first document. Each identified assertion describes a relationship between topics. The method may further include, for each identified assertion, generating assertion metadata describing a relationship between one or more topics in the assertion. The method also includes determining a set of documents stored by the managed research domain that contain assertions regarding the topics identified in the assertion. The method also provides an indication to a user of the set of documents that contain assertions regarding the topics identified in the one or more assertions.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention generally provide techniques for assisting a document author in creating research documents relative to existing research and knowledge. Further, embodiments of the invention enhance the ability of authors to determine whether their written statements are congruent with the established opinion of their research community, and write accordingly. For example, a researcher may see a statement determined to be strongly worded yet controversial relative to scientific consensus, and decide to bolster the assertion with additional citations and supporting data, or to change the strength of the statement altogether. Additionally, embodiments of the invention may provide authors with technical help. For example, an author unskilled in the art (e.g., a journalist or blogger) can be assisted by automated guidance for their statements in a drafted document.

When a user authors a research document (e.g., using an electronic word processor), the researcher can request the document be processed for annotation and semantic analysis by an annotation engine using a managed research domain. In one embodiment, a managed research domain is a universal repository for papers used in professional research. Researchers may submit a copy of a primary research work to the repository. In a particular embodiment, an extension to document generation software (e.g., a plug-in component for a word processor or specialized content creation tool) may be used to request the text of the document be processed.

When processed by a managed research domain, the research document may be evaluated using a variety of both general and domain specific semantic analysis tools. The tools may parse the document to identify both lexical and logical content. In one embodiment, a given research/repository domain is represented using a text analytics engine and domain information and dictionaries configured to parse and evaluate the content of the primary research document, relative to that research domain. Using the appropriate domain information and dictionaries are important because what a term means in one domain (e.g., life sciences) may not be consistent with the use of the same term in another domain (e.g., weather patterns and climatology research).

Among the statements within the document, there is some set of statements which are analyzed as being relevant to the given research domain. For example, in one embodiment, the text analytics engine may normalize the terms used in a document to a common ontology defined for a research domain. Once normalized, the text analytics engine may further evaluate the research document to identify assertions made by the primary research document based on the normalized terms. Examples of assertions that may be identified by the text analytics engine include assertions of causation, correlation, existence, truth or falsity, etc., relative to a particular concept (or concepts) from the ontology. The text analytics engine may additionally evaluate the strength of each of the assertions. In one specific example, the sentence "There is no evidence that compound X is linked to cancer Y" is analyzed to identify that the topics "compound X" and "cancer Y" have the strong relationship of "not correlated with". The evaluated assertions may be stored as metadata describing the relevant statements along with the document and returned to the user.

Once a document has been analyzed and metadata describing its statements has been generated, the managed research domain searches for documents in its repository containing related statements, i.e., statements that also make an assertion of causation, correlation, existence, truth or falsity, etc., relative to the particular concept (or concepts) from the ontology. In one embodiment, for each analyzed statement, the research domain searches a database for statements in documents stored in its repository that discuss the same topics with the same relationship. For example, using the above-mentioned example of statement "There is no evidence that compound X is linked to cancer Y," the database is searched for other documents also asserting whether there is a relationship between X and Y. Results of the search are returned to the user.

Further, the research document may be annotated to summarize statements of other documents in the research domains about the same topics. In one particular embodiment, document editing software displays an annotation for each analyzed statement alongside the research document. The annotations may be displayed as a summary of the entire research document, per selection of the corresponding analyzed statement, or inline with the research document text. Examples of possible annotations include prevalence graphs, line graphs, scatter plots, pie charts and other information graphics.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may access the managed research repository as well as the related text analytics engine and the related data available in the cloud. A user may also access document editing software and research document drafts available in the cloud. Doing so allows a user to access this information from any computing system attached to a network connected to the cloud (e.g., the Internet).

Figure 1:
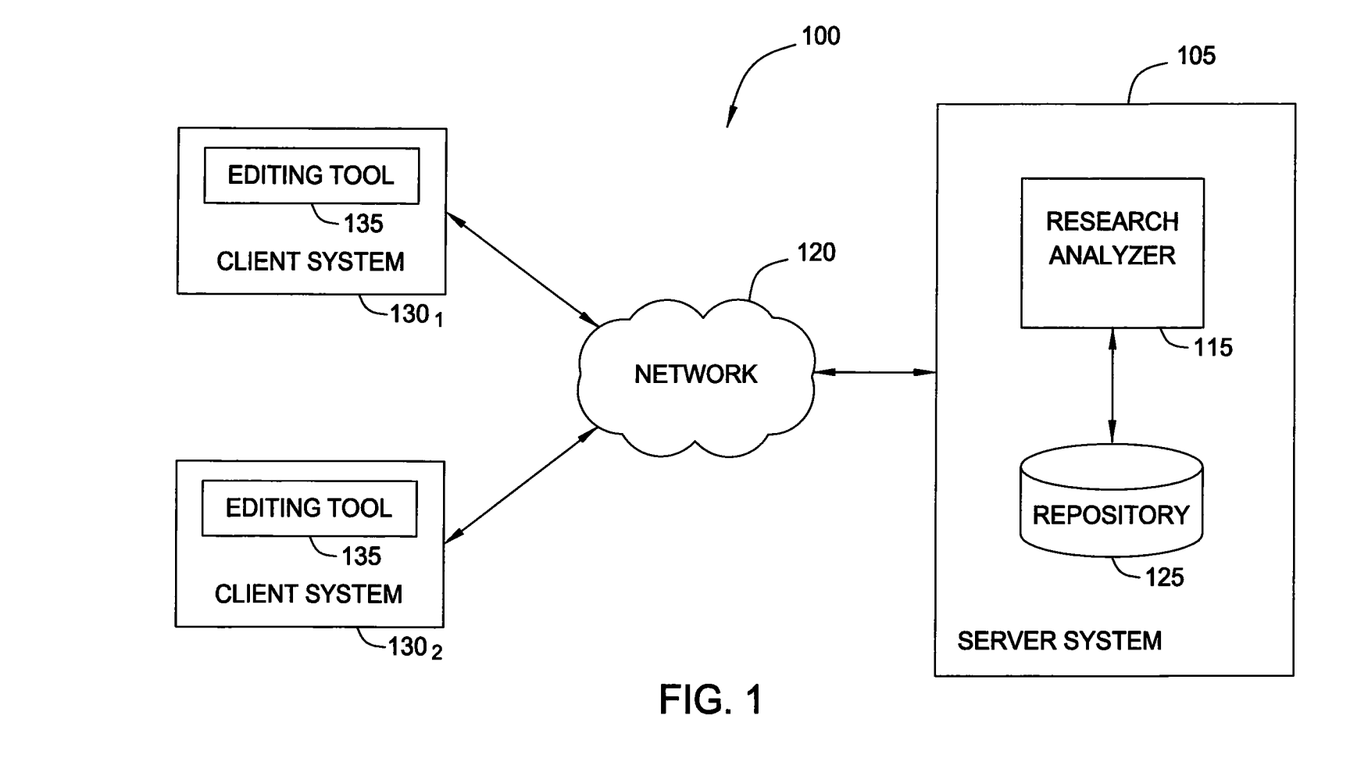
FIG. 1 illustrates a computing infrastructure configured to provide an annotated document in a managed document research domain, according to one embodiment of the invention.

FIG. 1 illustrates a computing infrastructure 100 configured to provide a managed document research domain, according to one embodiment of the invention. As shown, the computing infrastructure 100 includes a server computer system 105 and a plurality of client systems $130_{1-2}$, each connected to a communications network 120, and the server computer 105 includes a research document analyzer tool 115 and a research document repository 125.

In one embodiment, client systems $130_{1-2}$ include an editing tool 135 configured to communicate over the network 120 with the analyzer tool 115. The editing tool 135 generally allows a researcher to compose a research document. Accordingly, the editing tool 135 is representative of a broad variety of software applications such as a word processor, spreadsheet editor, HTML editor, and other authoring tools. In one embodiment, the editing 135 tool may be configured to allow a document author to submit a copy of the research document to the analyzer 115 (generally referred to as a draft research document). The editing tool 135 may also be configured to transmit the draft research document automatically (e.g., each time the draft document is saved, after a certain character or word counter is reached) or when a user expressly requests the submission through activating a menu or button in the editing tool 135. The editing tool may be configured to submit the entire draft research document or only a portion of the draft document (e.g., some selected text). In one example, the editing tool 135 may include a programmable extension or a plug-in component may be configured to submit the text of the draft document to the server computer system 105. Generally, the analyzer 115 receives text, such as text of the draft research document, and analyzes the text against the documents stored in the repository 125, as discussed in greater detail below. Afterwards, the analyzer 115 returns the results of the text analysis to the editing tool 135.

Figure 2:
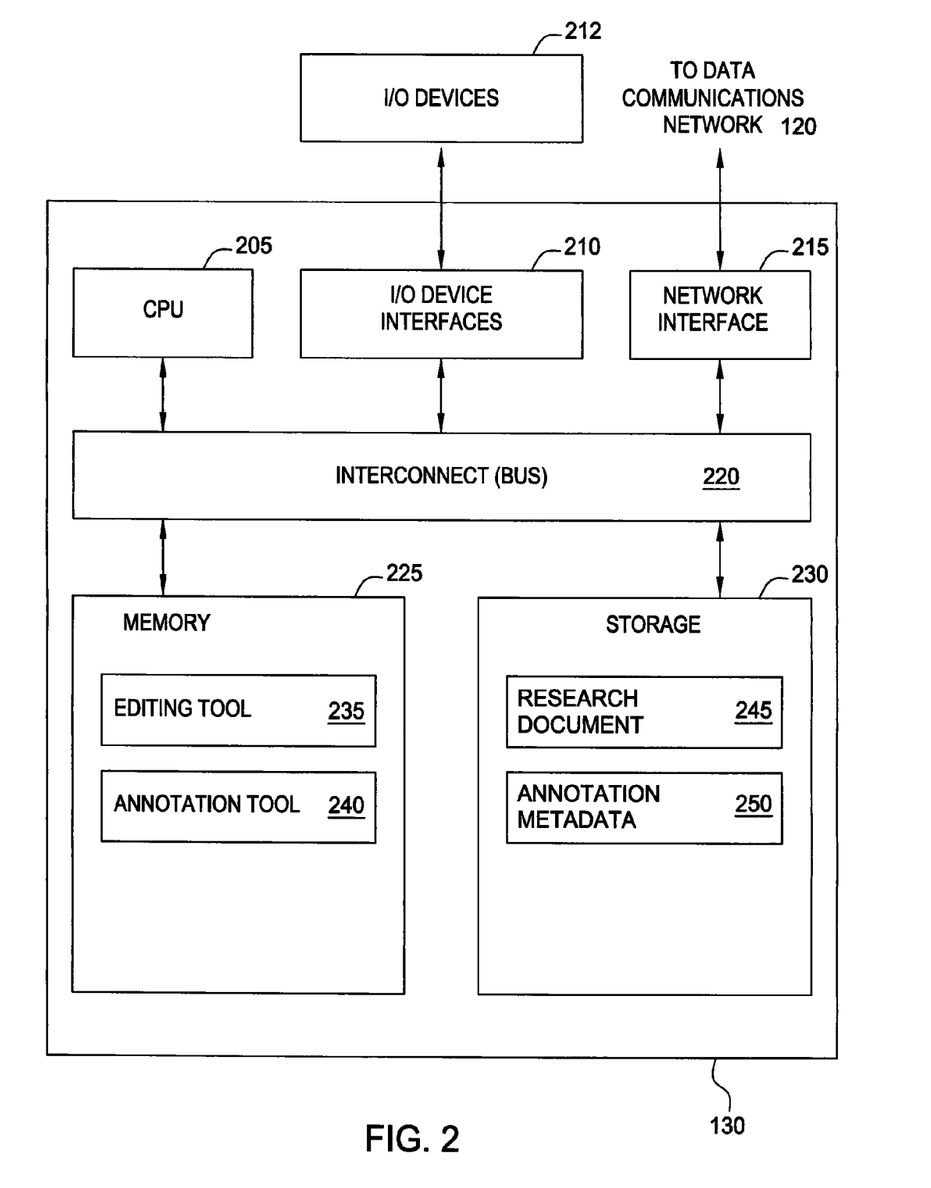
FIG. 2 illustrates a more detailed view of the client computing system of FIG. 1.

FIG. 2 is a more detailed view of the client computing system of FIG. 1, according to one embodiment of the invention. As shown, the client computing system 130 includes, without limitation, a central processing unit (CPU) 205, a network interface 215, an interconnect 220, a memory 225, and storage 230. The computing system 130 may also include an I/O device interface 210 connecting I/O devices 212 (e.g., keyboard, display and mouse devices) to the computing system 105.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive or flash memory storage drive (an SSD), may store non-volatile data.

Illustratively, the memory 225 includes an editing tool 235 and an annotation tool 240. The editing tool 235 provides a software application which allows a user to compose a research document. The editing tool 235 may also allow the user to submit such a research document to the managed document research domain for analysis, as well as receive metadata from the analyzer 115 containing the analysis results of the draft research document. In one embodiment, the annotation tool 240 illustrates the received metadata by displaying annotations of the research document which summarize statements found in other documents in the managed research domain discussing the same topics as the research document.

In this example, the storage 230 includes a research document 245 and annotation metadata 250. The research document 245 generally corresponds to a draft research document composed using the editing tool 235 and submitted to the managed document research domain for analysis. Annotation metadata 250 corresponds to metadata returned from the analyzer included in the research document 245. The annotation metadata 250 may be stored as a lightweight relational database format (e.g., SQLite), a structured data format such as Extensible Markup Language (XML), or other suitable data formats. In one embodiment, the annotation metadata 250 may be stored within the research document 245 data file.

Figure 3:
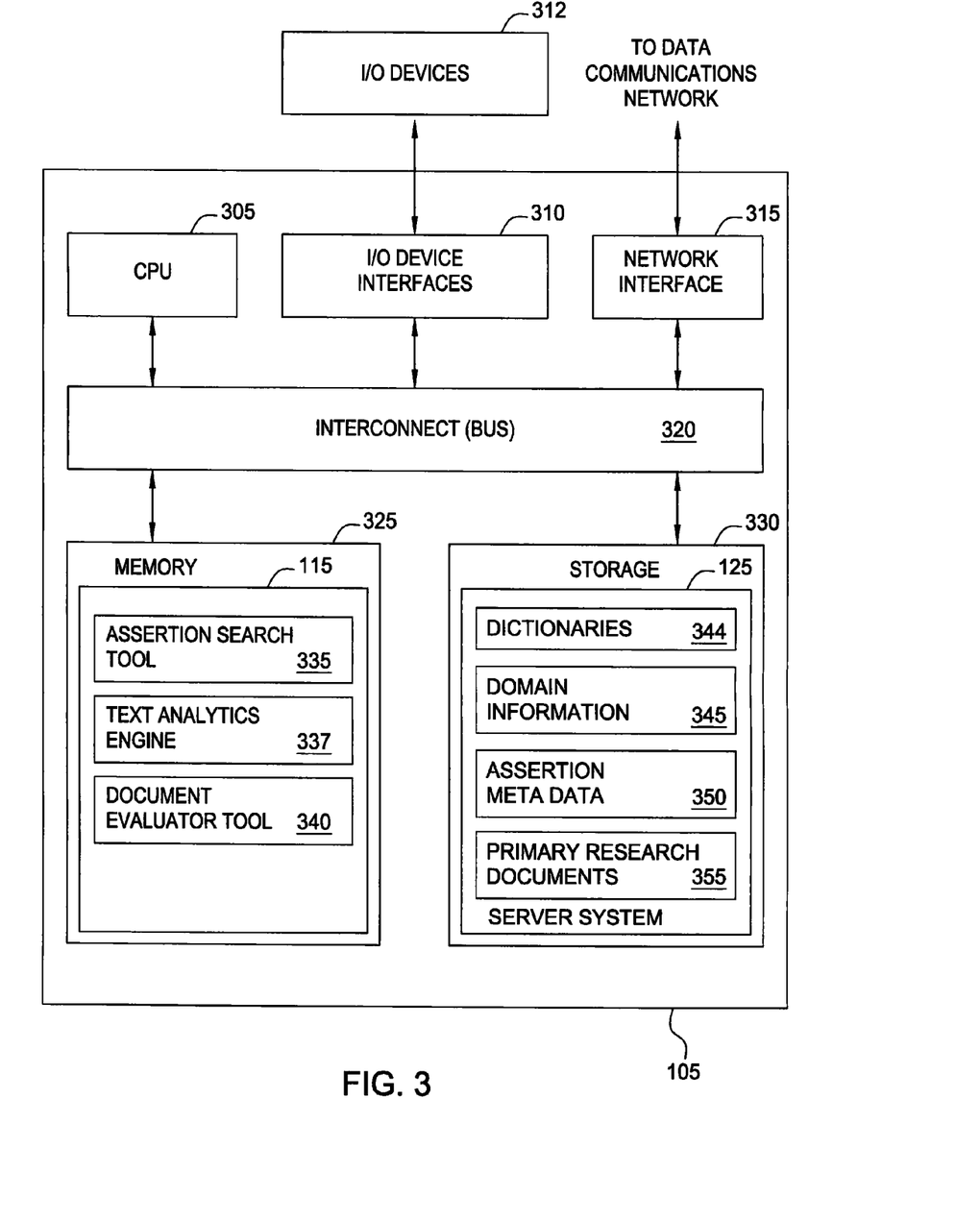
FIG. 3 illustrates a more detailed view of the server computing system of FIG. 1.

FIG. 3 is a more detailed view of the server computing system 105 of FIG. 1, according to one embodiment of the invention. As shown, server computing system 105 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, floppy disc drives, tape drives, removable memory cards, solid state drives (SSD), optical storage, network attached storage (NAS), or a storage area-network (SAN).

The memory 325 stores the analyzer tool 115 from FIG. 1, and the storage 345 includes the repository 125 from FIG. 1. As described above, the analyzer tool 115 includes a text analytics engine 337, an assertion search tool 335 and a document evaluation tool 340. The storage 345 includes research documents 355, domain information 345, dictionaries 344, and assertions metadata 350. The dictionaries 344 contain words, phrases, and other terminology that is defined for or used with frequency within the research domain. The research documents 355 include one or more documents which include words, phrases, sentences, sentence fragments, punctuation, or any portion, multiple, or combination thereof. The research documents 355 may also include audio, video or graphics. In various embodiments, the research documents 355 may include formatting, markup tags and structured data in addition to text. Of course, one of ordinary skill in the art will recognize that the functionality provided by the components of the analyzer tool 115 and the storage 345 included the repository 125 could be implemented in a variety of ways other than as shown in FIG. 3. Further, the functionality of these components could be distributed across multiple computing systems, e.g., using a variety of available web-services or other distributed computing frameworks.

The document evaluator tool 340 may be configured to receive the draft research document or a portion of the text of the draft research document, e.g., from a user interacting with the editing tool 235 of FIG. 2 and invoke the execution of the text analytics engine 337 on the draft research document. As described in detail below, the text analytics engine 337 may be configured to identify assertions in the research documents 355.

The text analytics engine 337 parses the text of a submitted draft research document to identify unique concepts, grammatical parts of speech, proper names, etc., as well as to identify related concepts in the documents that tend to indicate contextual relationships between those concepts. It is contemplated that the text analytics engine 337 also be used to parse the text of research documents 355 as they are submitted and stored within the repository 125. Different text analysis tools may be used that are tailored to specific knowledge areas, such as medical, financial, etc. The text analysis engine 337 may use natural language searching, fuzzy searching and data mining techniques to perform semantic analysis of the document. In one embodiment, the text analytics engine 337 may include a set of annotators each made of a piece of executable (or interpretable) code that creates annotations describing some aspect of content for a document being evaluated. Together, the set of annotators may build on top of one another to derive assertions about a research document. For example, a first annotator may parse a research document to identify each sentence, then, a second annotator could tag the words/phrases in the identified sentences according to parts-of-speech (e.g., nouns/verbs/adjectives). Then, a declarative or disambiguation annotator could evaluate the results of the previous two annotators. Such an annotator could normalize elements of the research document to an ontology related to a particular research domain. For example, one set of annotators may be used to evaluate documents related to research in the medical sciences, while another set of annotators may be composed to evaluate documents related to research in climatology (or other field of research). Users may compose the annotators using an application such as an annotator creation tool (not shown).

In an alternative embodiment, the text analytics engine 337 may be configured according to the publically available Unstructured Information Management Architecture (UIMA). UIMA provides a collection of component software architecture for the development, discovery, composition, and deployment of multi-modal analytics for the analysis of unstructured information (e.g., a primary research document 355) as integrated with search technologies. Of course, other architectures or frameworks for evaluating unstructured information may be used. For example, the text analytics engine 337 may use the techniques of Natural Language Processing (NLP), computational linguistics, speech tagging, discourse analysis, co-reference resolution, morphological segmentation, Named Entity Recognition (NER), Optical Character Recognition (OCR), grammatical parsing of a parse tree, relationship extraction, speech recognition, speech segmentation, topic segmentation and recognition, or any combination thereof.

Figure 4:
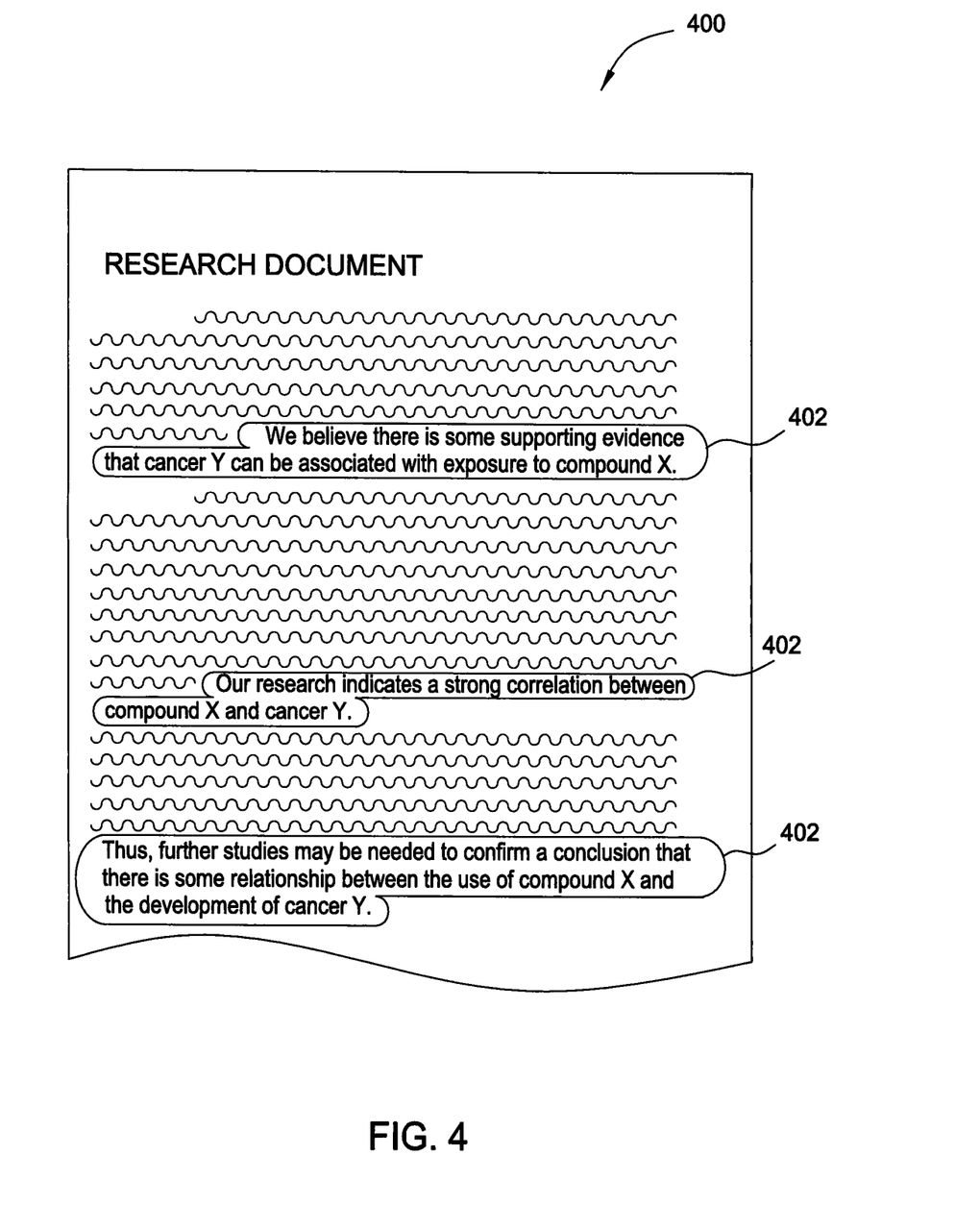
FIG. 4 illustrates an electronic research document according to one embodiment of the invention.

Once normalized to a given ontology, the text analytics engine 337 may be used to identify assertions made by the draft research document, based on the normalized terms. As illustrated in FIG. 4, a draft research document 400 includes one or more statements 402 identified as relevant to the managed research domain. Additional statements of the draft research document 400 are represented as wavy lines for clarity. Generally, a set of statements 402 may form a logical argument having one or more premises and a conclusion. The premises and conclusion may be included in the same statement 402 or may be distributed over several statements 402. In one specific example of a draft research document 400, the following example statements 402 may be identified and analyzed as pertaining to the research domain:

"There is no evidence that compound X is linked to cancer Y."

"We believe there is some supporting evidence that cancer Y can be associated with exposure to compound X."

"It is clear that there is strong evidence to abandon compound X because of its undisputable link with cancer Y."

The text analytics engine 337 scans the statements 402 and identifies discussed topics, a relationship asserted between the topics, and an overall strength of the assertion. The text analytics engine 337 uses the dictionaries 344 and domain information 345 as sources of information for identifying topics relevant to the research domain. In the example described above, the text analytics engine 337 identifies the topics "compound X" and "cancer Y" for each of statements. The text analytics engine 337 also classifies an association or relationship between the identified topics. As noted above, examples of associations that may be identified by the text analytics engine 337 include associations of causation, correlation, coincidence, existence, truth or falsity, etc., relative to a particular normalized term, concept or concepts from the ontology.

Further, the text analytics engine 337 evaluates a strength of the overall assertion in each of the statements 402, e.g., a real-numbered value between from 0 to 1. The strength can be expressed as a negative term to indicate a negative association. Using one of the example statements 402 listed above, the text analytics engine 337 may deconstruct and analyze the statement to generate the following information:

Topic1: chemical compound X
Topic2: disease: cancer: Y
Association: topic1 co-incident-with topic2
Strength: 0.5

Once identified, the text analytics engine 337 generates metadata to describe the topic relationship data identified within the statement. The metadata may be temporarily stored within memory 325, returned to the client system 130 or stored within the repository 125 as assertion metadata 350. The assertion search tool 335 searches the managed research domain repository for documents having statements similar to the analyzed statements 402. In one embodiment, the assertion search tool 335 uses the metadata generated by the text analytics engine 337 to search assertion metadata 350 stored in the repository 125.

Figure 5:
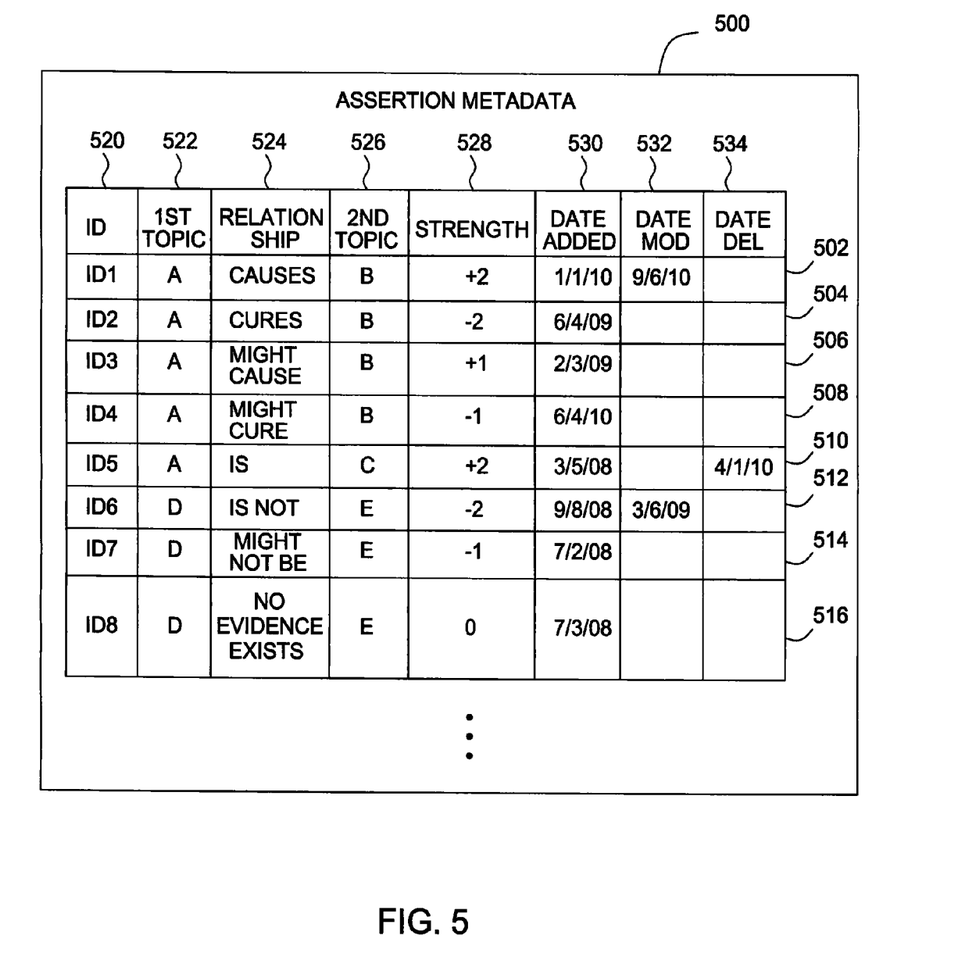
FIG. 5 depicts a block diagram of an example data structure for topic data, according to an embodiment of the invention.

FIG. 5 illustrates an example of a data structure storing the assertion metadata 500. Generally, the assertion metadata 500 describes statements of documents 355 in the managed research domain repository 125. As shown in FIG. 5, the assertion metadata may include example records 502, 504, 506, 508, 510, 512, 514 and 516, each comprising an identifier field 520, a first topic field 522, a relationship field 524, a second topic field 526, a strength field 528, a date added field 530, a date modified field 532, and a date deleted field 534. The identifier field 520 may uniquely identify a statement in a document 355. The identifier 520 may uniquely identify the statement by identifying a line, statement or sentence number within a document 355 or by identifying the document 355 that includes the statement. As described above, the statement is a sentence or a sentence fragment in a research document 355 and includes the first topic 522, the relationship 524 and the second topic 526. The first topic 522 and the second topic 526 are nouns or phrases that contain nouns in the research document 355 that is identified by the identifier 320 in the same record. In various embodiments, the same or different authors may create, modify or delete the same or different statements in the documents 150.

The relationship 524 may be a verb or a verb phrase and identifies a relationship, category or connection between the first topic 522 and the second topic 526, in the same record. In the data structure shown, examples of relationships include "is," "is not," "has," "does not have," "causes," "does not cause," "cures," "does not cure", and "no evidence exists." In various embodiments, the relationship 524 may identify a causal relationship, a hierarchical relationship, a connective relationship, a concomitant relationship, a quantitative relationship, a qualitative relationship, a causal relationship, a correlation relationship, coincidental relationship, or any other type or relationship.

In an embodiment the strength 528 is a value, such as a numerical value, that identifies, characterizes or describes the strength, significance, intensity or importance of the relationship 524 in the same record. The strength 328 describes the relationship 324 that is stated by the author of the statement and characterizes the amount or degree of conviction of the opinion of the author, as to the relationship 324 between the first topic 322 and the second topic 526. For example, the strength 528 in the record 502 is a larger (higher positive) number than the strength 528 in the record 506 because the relationship 524 of "causes" in the record 502 has a higher degree of author conviction or certainty than the relationship 524 of "might cause" in the record 506. Analogously, the strength 528 in the record 512 is a lower (higher absolute value) number than the strength 528 in the record 514 because the relationship 524 of "is not" in the record 512 has a higher degree of author conviction or certainty than the relationship 524 of "might not be" in the record 514. The strength 528 in the record 516 is zero because the author of the statement indicates a neutral relationship between the first topic 522 and the second topic 526 in the same record via the relationship "no evidence exists." Other examples of neutral relationships include "no conclusion can be drawn" and "the evidence is insufficient to support a determination."

In an embodiment, the strength 528 may be positive, negative or neutral. Positive and negative strengths identify opposite relationships, and a neutral strength is between the positive and the negative strengths. If a first statement with a high positive strength between two topics is true, then a second statement with a high negative (a negative sign with a high absolute value) strength between those two topics is false. If a first statement with a high positive strength between two topics is false, then a second statement with a high negative (a negative sign with a high absolute value) strength between those two topics is true. If a first statement with a high negative (a negative sign with a high absolute value) strength between two topics is true, then a second statement with a high positive strength between those two topics is false. If a first statement with a high negative (a negative sign with a high absolute value) strength between two topics is false, then a second statement with a high positive strength between those two topics is true. A strength is highly positive if it is more than a threshold number and highly negative if it is less than another threshold number. In other embodiments, any range of numbers for the strength 328 may be used.

The date added field 530 specifies the date that the statement in the same record was added to a document 355. The date modified field 532 specifies the date that the statement in the same record was modified, updated or changed in the document 150, subsequent to being added to the document 355. The date deleted field 534 specifies the date that the statement in the same record was deleted or removed from the document 355. In various embodiments, the dates may include centuries, decades, years, months, days, days of the week, hours, minutes, seconds, or any multiple, portion, and/or combination thereof.

Returning to FIG. 3, as described above, the assertion search tool 335 searches the assertion metadata 350 for records that match a similar relationship of one topic and another topic as the analyzed statements of a draft research document. For example, the assertion search tool 335 may query the assertion metadata 350 for records containing the same "topic1," "topic2" and "relationship" fields 520, 522, 524 as a given analyzed draft statement. The assertion search tool 335 may return the search results to a client system 130. The search results are formulated as annotation metadata 250 containing assertion metadata 350 records (e.g., record 502, 504, etc.) and their corresponding ID, $1^{st}$ Topic, Relationship, $2^{nd}$ Topic, and Strength fields 520, 522, 524, 526, 528. The annotation metadata 250 further contains information identifying each document from which a related statement is found. For example, the annotation metadata 250 may contain the title, author, citation information and a link of each document having a related statement or assertion.

Figure 6:
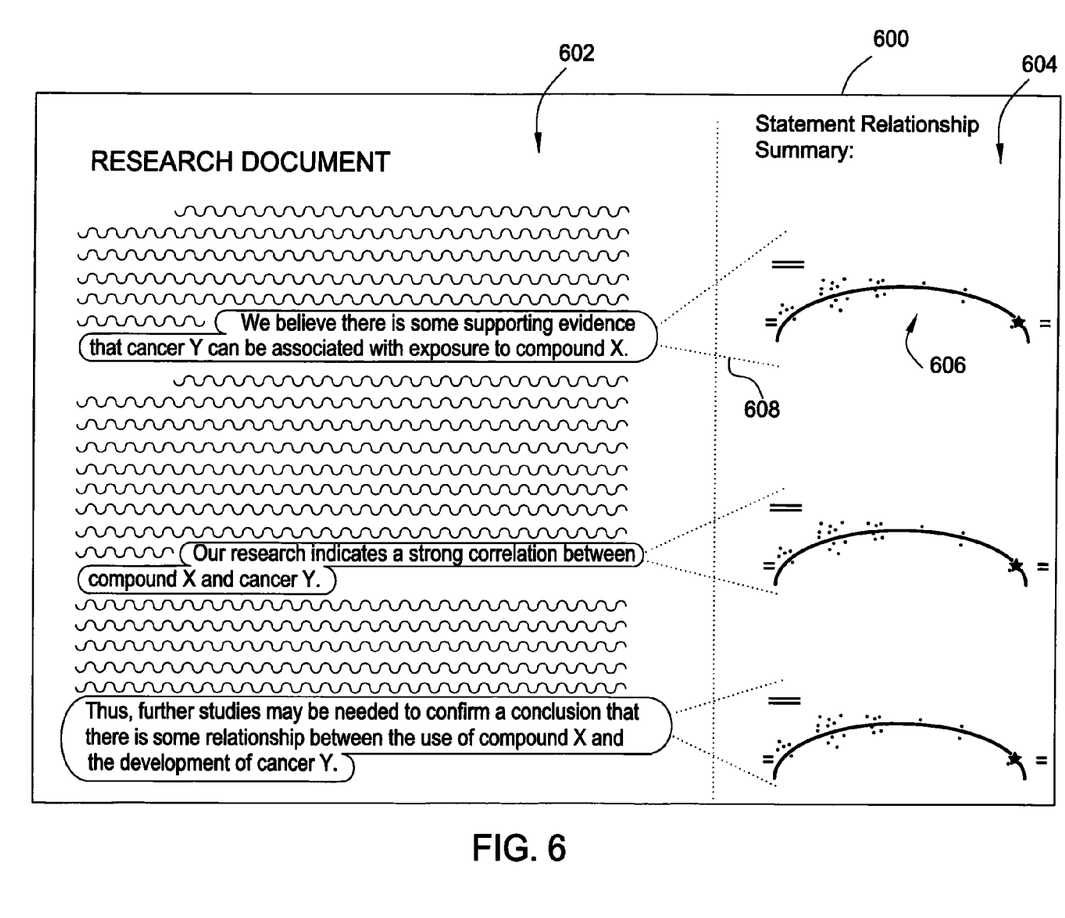
FIG. 6 illustrates the research document of FIG. 4 annotated according to one embodiment of the invention.

FIG. 6 illustrates a draft research document 600 displaying annotations according to an embodiment of the invention. As described above, the editing tool 235 submits the draft research document 245 for analysis by the managed research domain. The client system 130 receives the analysis results back in the form of annotation metadata 250. For each analyzed statement in the draft research document 245, the annotation metadata 250 contains information and records of other statements in the managed research domain related to the topics discussed. The annotation tool 240 uses the annotation metadata 250 to display annotations 606 within the research document 245 that illustrate the range of statements found in the managed research domain relative to a given statement in the draft research document 245. In the embodiment shown in FIG. 6, the annotation tool 240 displays a diagram that graphs the relationships asserted between topics in the related statements in the managed research domain and the prevalence of those relationships. Further, the annotation tool 240 further displays the relationship asserted between topics in the given statement of the research document 245. As shown in FIG. 6, the annotation tool 240 may depict the annotations 606 as a summary 604 of all relationships in the research document. The annotations 606 are illustrated as call-outs 608 from the text 602 of the research document. A researcher may quickly scan the text 604 of the research document and the corresponding annotations 606 to determine how the asserted statements fall within line with a managed research domain. Alternatively, the annotation tool 240 may annotate the research document upon a single selection of a statement within the research document.

Figure 7A:
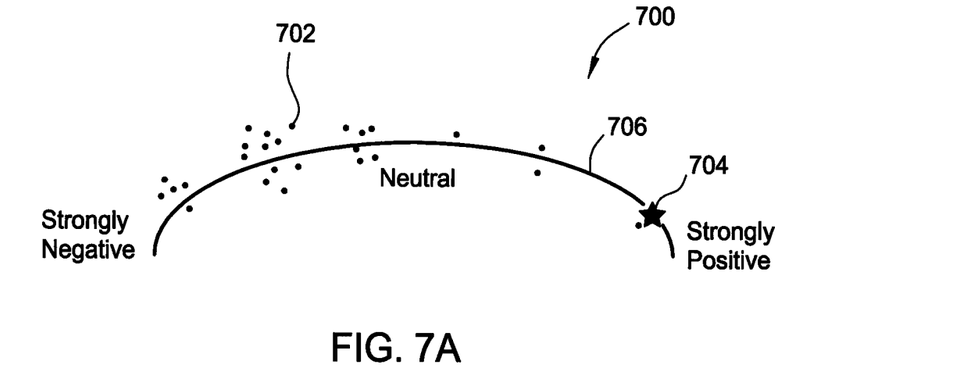
FIGS. 7A-7C illustrate alternative embodiments of annotations according to embodiments of the invention.

For example, an annotation diagram 700 seen in FIG. 7A includes one or more dots 702 forming a prevalence line 706 that summarizes other documents in the research domain containing statements about the same topic. The frequency of one or more dots 702 at one portion of the prevalence line reflects the prevalence of that asserted strength of the relationship in the other documents. Each of the dots 702 may be configured to link to the document in the managed research domain. For example, the user interface of the editing tool 230 may be configured so that when a user click on one of the dots 702, a software application such as a web browser may open to access the selected document in the managed research domain. In another example, the user interface of the editing tool 230 may be configured so that when a user "hovers" an input selection device (e.g., a mouse) over one of the dots 702, a text pop-up may appear providing information regarding the highlighted document in the managed research domain (e.g., research document title, author, and other citations).

As shown in FIG. 7A, a cluster of dots 702 near the end of the line labeled "Strongly Negative" indicates that a number of documents have expressed a strongly negative assertion with regards to the same topics. Each dot 702 represents a document in the managed research domain. A prominent indicator, such as a star 704, indicates where the present statement falls within the prevalence line 706. In this way, a researcher may gauge the present statement relative to the managed research domain, and relative to the body of published work. As seen in FIG. 7A, star 704 falls on opposite end of the spectrum, i.e., the "strongly positive" relationship, than the other dots 702. As such, a researcher can conclude that the given statement annotated by annotation 700 contradicts a majority of statements made within the managed research domain. In response, the researcher may subsequently modify the given assertion or provide additional support for the apparently controversial statement.

Figure 7B:
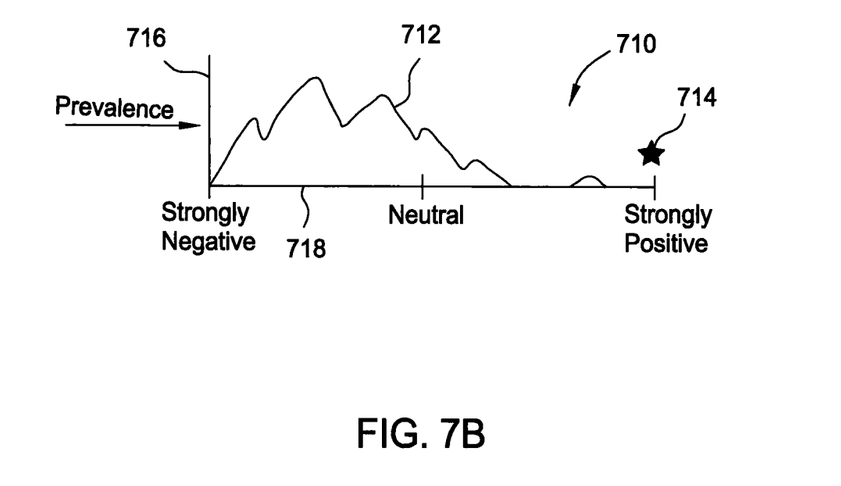

FIG. 7B illustrates an alternative annotation 710 summarizing the other documents in the research domain having statements about the same topics. Annotation 710 includes a prevalence graph 710, according to an embodiment of the invention. The prevalence graph 710 is illustrated using a two-dimensional depiction of a three-dimensional coordinate system, with prevalence data on the y-axis (vertical axis) 716, a strength of statements on the x-axis (horizontal axis) 718. Each point on the line 712 represents a statement (that includes a topic A and a topic B) via dual numerical coordinate values: a prevalence data value of a strength value. The prevalence data is the number of the statements (that exist in the managed domain repository 125) that contain a relationship of the topic A to the topic B. As discussed above, the strength characterizes the strength or conviction of the opinion of the author of the relationship that is stated in the statement. The example prevalence graph 710 illustrates that statements with topics A and topics B contain relationships that had strengths that were predominantly negative, but for which the present statement has asserted a strongly positive relationship (indicated by star 714.)

Figure 7C:
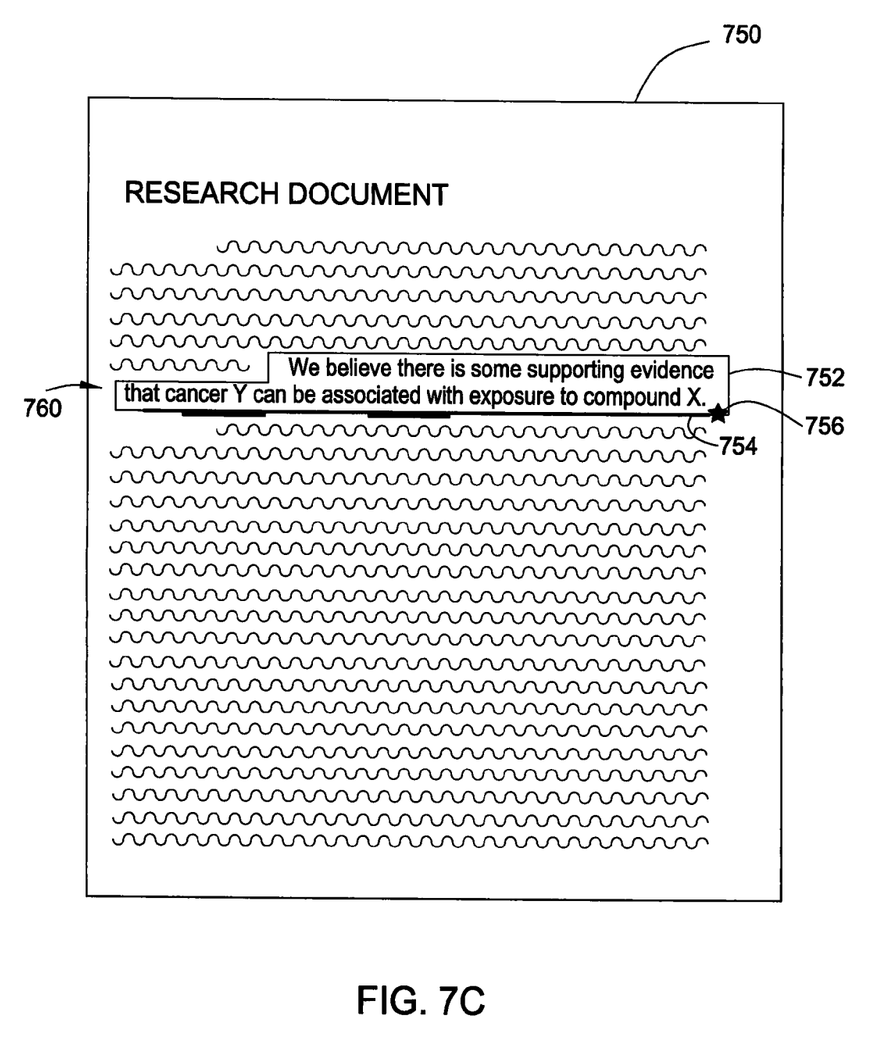

FIG. 7C illustrates yet another embodiment of annotations 760 within a research document 750, where the annotations 760 are inline (instead of alongside or outside) the statements 752 of the research document 750 to provide a concise and compact manner of displaying the logical statement relationship of documents in the research domain. The annotations 760 include a prevalence line 754, where the thickness of the prevalence line reflects the prevalence of documents having statements with the same relationship and the same topics. The annotations 760 also include a star 756 where the present statement 752 falls within the prevalence line.

Figure 8:
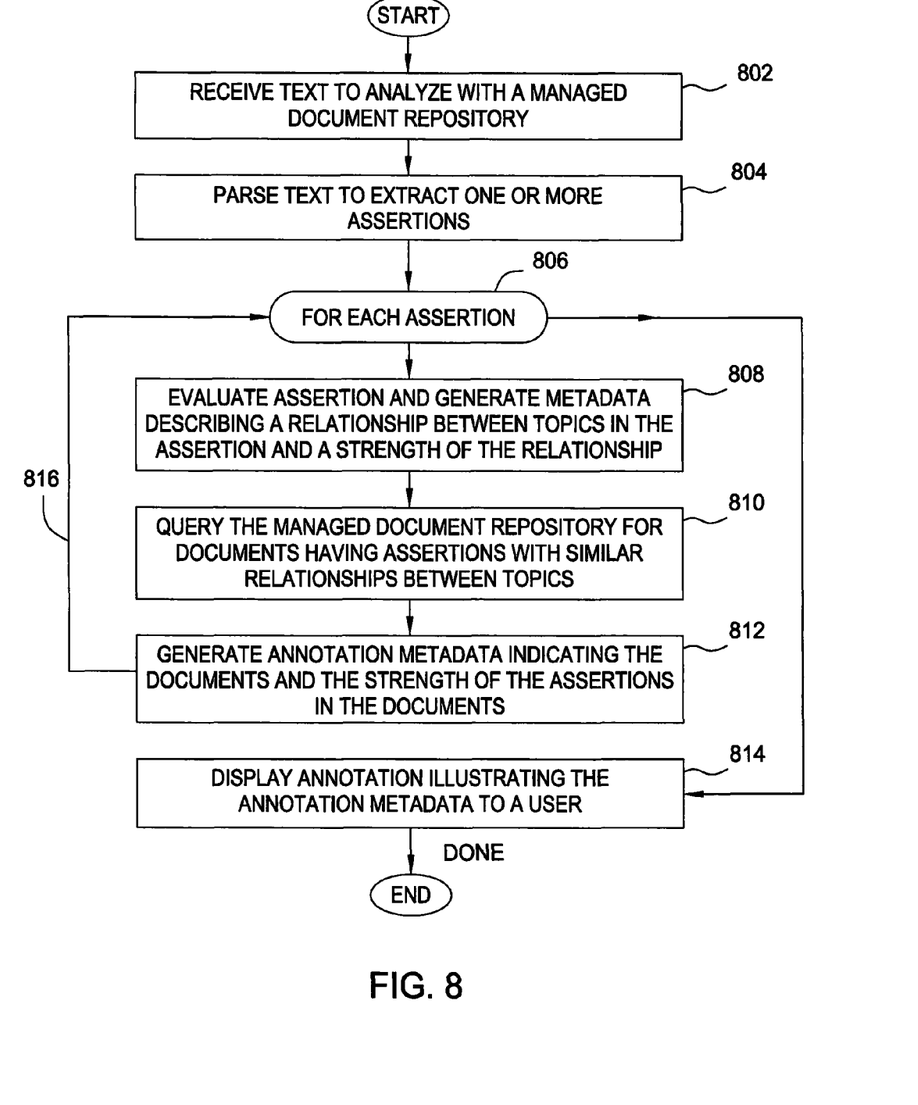
FIG. 8 depicts a flowchart of an example method for annotating a draft research document using a managed research domain, according to one embodiment of the invention.

FIG. 4 illustrates a method 800 for annotating a draft research document using a managed research domain, according to one embodiment of the invention. As shown, the method begins at step 802 where the document evaluator tool receives the text of a draft research document to analyze using the documents in the managed repository. As noted above, a user may interact with a document editing tool (or other software) to submit a portion of or the entirety of the draft research document for analysis.

At step 804, the document evaluator tool invokes a text analytics engine 337 to parse the text submitted in step 802 to extract one or more assertions pertaining to the managed research domain. At step 804, a loop begins where each assertion in the draft research document is evaluated. First at step 808, the text analytics engine 337 evaluates an assertion to identify a relationship between topics in the assertion and a strength of the relationship. The text analytics engine 337 then generates assertion metadata describing the topics, the relationship identified and the strength of the relationship.

At step 810, the assertion search tool 335 uses the metadata generated in step 808 to query assertion metadata 350 of the managed document repository. The assertion search tool 335 searches for documents having assertions with a similar relationship between topics. At step 812, the assertion search tool 335 generates annotation metadata indicating the documents found and information regarding the found statements, including strength of the relationship of the topics. After all assertions have been evaluated by loop 816, at step 814, an annotation tool 240 displays one or more annotations illustrating the annotation metadata to a user. As described above, the annotation tool 240 displays the one or more annotations within a document editing tool 230 as an information visualization graphic.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product analyzing a document with a managed research domain, the computer program product comprising:
    a non-transitory computer-readable storage medium having computer-readable program code embodied therewith, the computer-readable program code comprising:
        computer-readable program code configured to parse text of a first document to identify one or more assertions made by the text of the first document, wherein each assertion comprises one or more premises and at least one conclusion; and
        computer-readable program code configured to, for each identified assertion:
            generate assertion metadata describing a relationship between one or more topics in the assertion, wherein the assertion metadata further comprises a measure of strength of the identified assertion, and
            determine a set of documents stored by the managed research domain that contain assertions regarding the topics identified in the assertion; and
        computer-readable program code configured to provide an indication to a user of the set of documents that contain assertions regarding the topics identified in the one or more assertions.

2. The computer program product of claim 1, the computer-readable program code configured to parse the text comprises:
    computer-readable program code configured to normalize the text of the first document to an ontology defined for the managed research domain; and
    computer-readable program code configured to, from the normalized text, identify the one or more assertions.

3. The computer program product of claim 1, wherein the indication comprises an annotation illustrating the set of documents corresponding to each identified assertions.

4. The computer program product of claim 1, wherein the computer-readable program code further comprises:
    computer-readable program code configured to receive a request for a second document, the second document selected from the set of documents; and
    computer-readable program code configured to return the second document to a user.

5. The computer program product of claim 4, wherein the computer-readable program code configured to return the second document further comprises:
    computer-readable program code configured to highlight a portion of the second document which contains assertions regarding the topics identified in the assertions of the first document.

6. The computer program product of claim 1, wherein the indication provides a prevalence of assertion strengths made by a first topic and a second topic identified in the assertion.

7. The computer program product of claim 1, wherein the relationships between the topics in an assertion is selected from at least one of coincidental with, caused by, causes, is, is not, and correlated to.

8. A computer system for analyzing a document with a managed research domain, comprising:
    a processor; and
    a memory storing instructions executable by the processor that cause the processor to:
        parse text of a first document to identify one or more assertions made by the text of the first document, wherein each assertion comprises one or more premises and at least one conclusion;
        for each identified assertion:
            generate assertion metadata describing a relationship between one or more topics in the assertion, wherein the assertion metadata further comprises a measure of strength of the identified assertion, determine a set of documents stored by the managed research domain that contain assertions regarding the topics identified in the assertion; and provide an indication to a user of the set of documents that contain assertions regarding the topics identified in the one or more assertions.

9. The computer system of claim 8, wherein the memory stores the instructions further causes the processor to:

normalize the text of the first document to an ontology defined for the managed research domain; and from the normalized text, identify the one or more assertions.

10. The computer system of claim 8, wherein the indication comprises an annotation illustrating the set of documents corresponding to each identified assertions.

11. The computer system of claim 8, wherein the memory stores the instructions further causes the processor to:

receive a request for a second document, the second document selected from the set of documents; and return the second document to a user.

12. The computer system of claim 11, wherein the memory stores the instructions further causes the processor to:

highlight a portion of the second document which contains assertions regarding the topics identified in the assertions of the first document.

13. The computer system of claim 8, wherein the indication provides a prevalence of assertion strengths made by a first topic and a second topic identified in the assertion.

14. The computer system of claim 8, wherein the relationships between the topics in an assertion is selected from at least one of coincidental with, caused by, causes, is, is not, and correlated to.

* * * * *